UNITED STATES PATENT OFFICE.

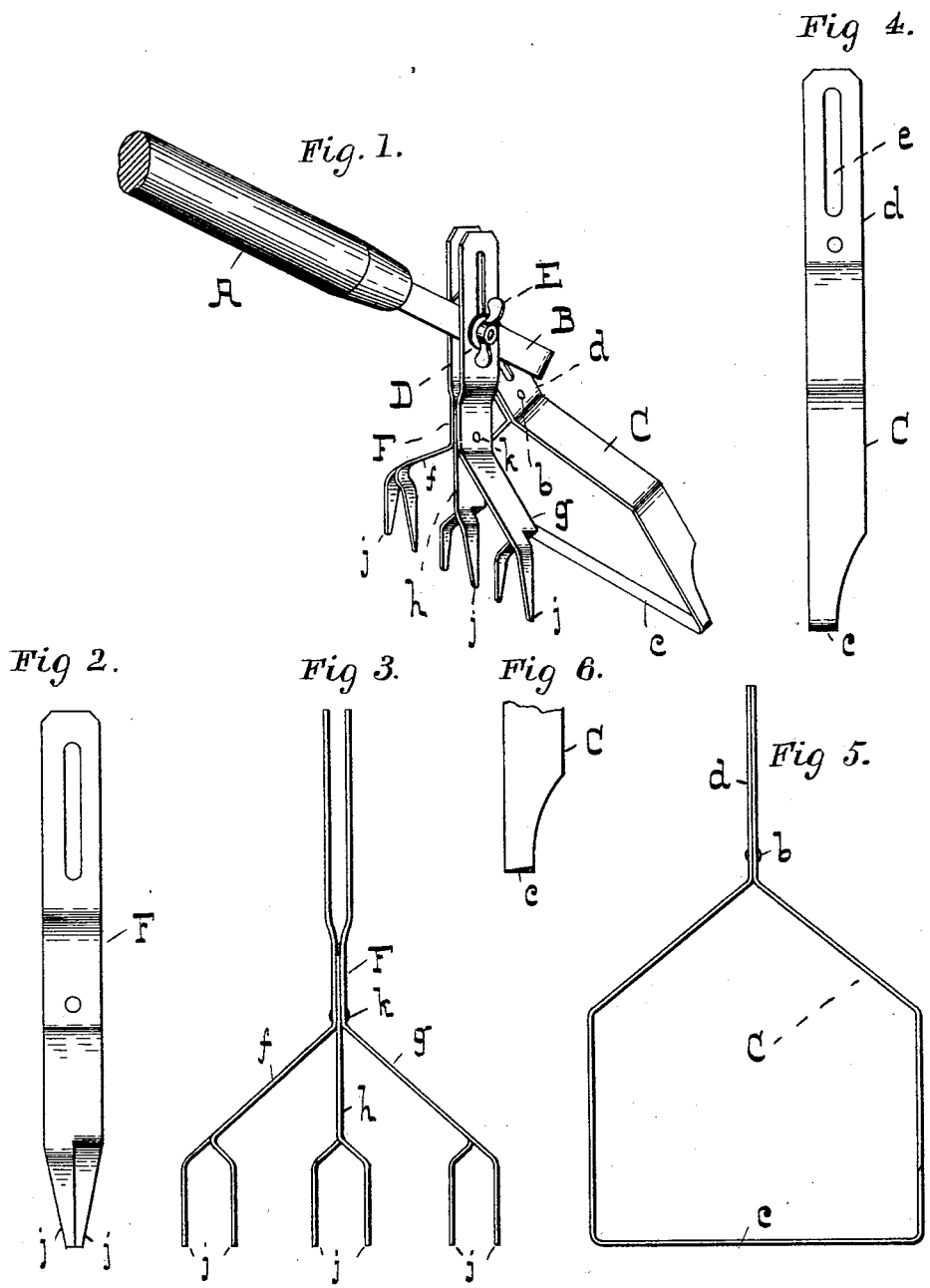

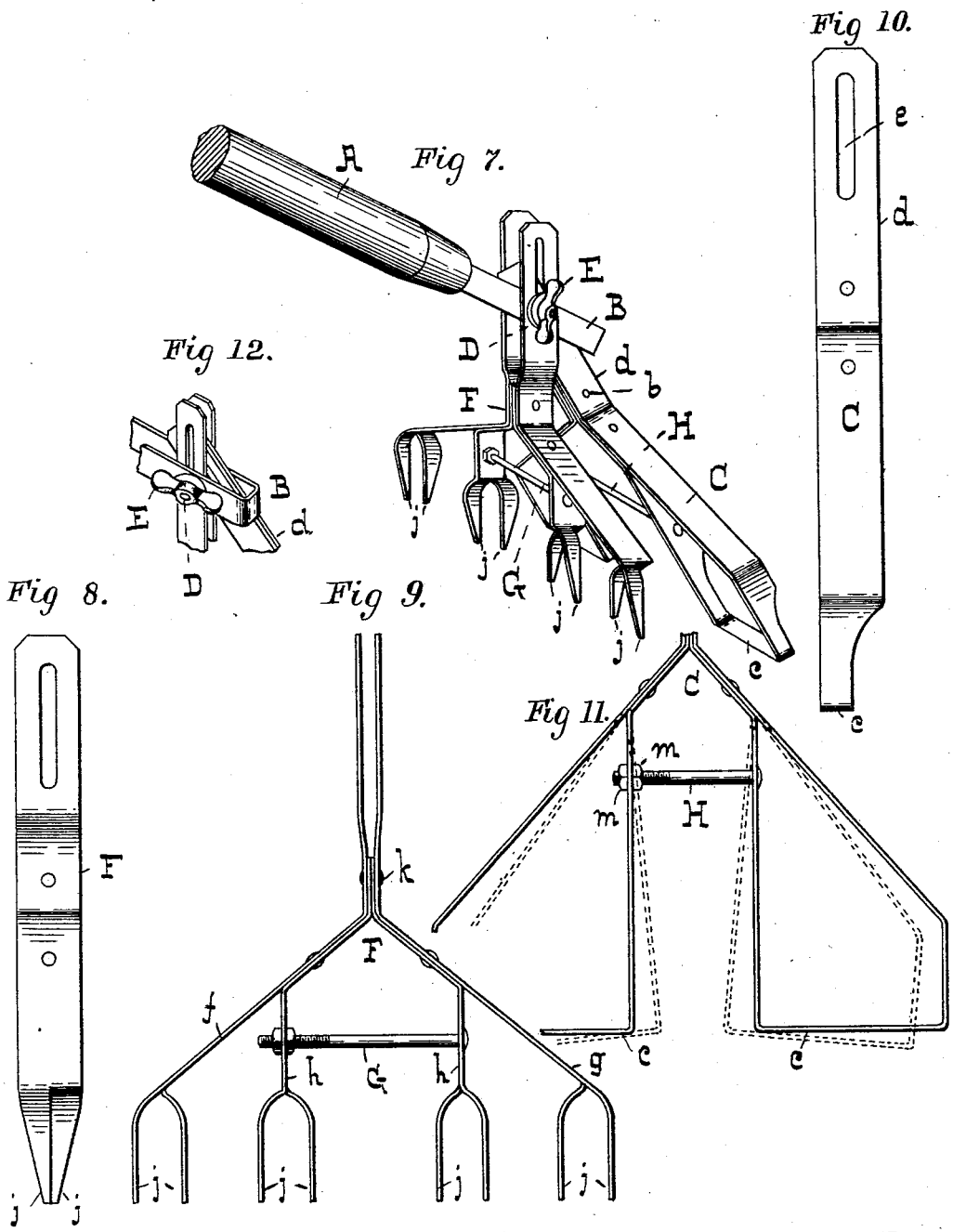

GEORGE W. McCOMAS, OF SINGER, MARYLAND.

HAND GARDEN-TOOL.

SPECIFICATION forming part of Letters Patent No. 590,583, dated September 28, 1897.

Application filed April 5, 1897. Serial No. 630,670. (No model.)

*To all whom it may concern:*

Be it known that I, GEORGE W. McCOMAS, of Singer, in the county of Harford and State of Maryland, have invented certain Improvements in Hand-Operated Garden and Field Tools, of which the following is a specification.

The object of this invention is to construct a device which may be drawn longitudinally of a row of plants to destroy the weeds at each side thereof without interfering with the plants or materially disturbing the earth.

With this in view the device consists principally in a system of teeth to slice or break the crust formed on the surface of the earth by the action of the sun thereon and an open-band hoe which passes under the broken crust and cuts the weeds so as to destroy them, the whole being combined so as to form a single tool adapted for application to a handle.

It further consists in a peculiar construction of the two elements of the device whereby they are adjustable one with the other to admit of variation in the depth of cut effected by the hoe, and also adjustable separately to adapt the tool for different kinds of work, as will hereinafter fully appear.

In the further description of the said invention which follows reference is made to the accompanying drawings, forming a part hereof, and in which—

Figure 1 is a perspective view of the tool in its simplest form or in the form in which it is used when the earth is worked at each side of the row of plants separately. Figs. 2 to 6, inclusive, are enlarged details of the tool. Fig. 7 is a perspective view of the tool arranged so that it may be drawn along and over the row of plants and the earth on both sides of the row worked at one operation. Figs. 8, 9, 10, and 11 are enlarged details of this tool. Fig. 12 illustrates a modification in the construction of a part of the tool hereinafter described.

Referring now to Figs. 1 to 6, inclusive, A is the handle of the tool, which may be of any convenient length. Inserted in the lower end of the handle is a head B, consisting of a folded strip of iron. In folding the strip to form the head B the two parts or sections thereof are made to stand apart, and between them is inserted the shank *d* of the hoe C. The hoe consists of a thin steel strip bent into the form shown in Fig. 5—that is to say, as seen from the back or front it is nearly square—but the upper ends of the strip are inclined and brought together to form the shank *d*, before referred to as inserted in the head B. A rivet *b* secures the two parts of the shank together. The portion of the strip forming the bottom *c* of the hoe is made somewhat narrower than the remaining portions, and its inner edge is sharpened to form a cutter, as shown in Fig. 6, which is a section of the lower part of the hoe. By referring to Fig. 4, which is an exterior side view of the hoe, it will be seen that the shank *d* has a slot *e*, and through this slot and a hole in the head B is inserted a bolt D, having a thumb-nut E to hold them to the head B, as shown in Fig. 1. The crust-cutter as an entirety is designated by F and is shown alone in Figs. 2 and 3. It consists of three strips of sheet-steel *f*, *g*, and *h*. The central strip *h* is straight to near its lower end, where it is tapered and slit, and the two parts formed by the slit are thrown out in opposite directions to form teeth *j*. The side strips *f* and *g* differ from the central one only in that they are offset at their lower ends and spread sufficiently at their upper ends to allow of their being passed over the head B. They are slotted in like manner to the shank of the hoe and connected to the head by the bolt D. The three sections or parts *f*, *g*, and *h* of the crust-cutter are united by a rivet *k*.

From the above description it will be seen that the hoe and crust-cutter are adjustable one with the other, and also collectively adjustable with reference to the head. Consequently the angle of either device may be changed and the projection of the hoe below the teeth of the crust-cutter altered to suit circumstances.

When the tool is drawn along a row of plants and at a proper lateral distance from them, the crust-cutter breaks up the crust of the earth and the hoe passing under its surface cuts the weeds without displacing the earth.

In view of the narrowness of the portion of the hoe which enters the earth and of the absence of any obstructing device above it the broken surface is practically unchanged by the movement of the hoe, and the weeds are destroyed by the cutting of their stalks or roots below the surface of the ground.

With this tool both sides of the plant-row have to be worked unless the width of the tool is equal to the distance between the rows and a little over.

The tool shown in Figs. 7, 8, 9, 10, and 11 is intended to be drawn along over the rows of plants, and with this end in view it is necessary that there should be a central space in the cutter and hoe somewhat greater in width than that of the row of plants to be worked. To effect this, I separate the strips $f$ and $g$ of the crust-cutter so as to make them a greater distance apart, and instead of a central toothed strip $h$ I use two. The strips $h$ are connected by a bolt G, which stiffens the device and, if desired, allows of the distance between the two sets of teeth $j$ being altered.

The hoe differs from the one before described in that it is in two sections which stand apart so as not to strike the plants in the row.

The two sections are connected by a bolt H, whereby the distance between them may be altered to suit the width of the row of plants. The full and dotted delineation of the hoe in Fig. 11 illustrates the extreme positions into which it may be placed by adjusting the nuts $m$ on the bolt H.

In Fig. 12 the shanks of the hoe and crust-cutter are both inserted in the head B, the width of the head being increased sufficiently to allow of this change.

I claim as my invention—

1. In a garden-tool, a handle having a head at its end, combined with a crust-cutter and an open-band hoe which are pivoted together and to the said handle, substantially as specified.

2. In a garden-tool, a handle combined with a crust-cutter, and an open-band hoe both of which are pivoted to the said handle and adjustable in angle of inclination one with the other, substantially as specified.

3. In a garden-tool, the combination of a crust-cutter, and an open-band hoe in sections with means to effect the lateral adjustment of the said sections, the crust-cutter and hoe being pivoted to a handle and adjustable in angle of inclination one with the other, substantially as specified.

GEORGE W. McCOMAS.

Witnesses:
WM. T. HOWARD,
DANL. FISHER.